United States Patent
Vanrell

(10) Patent No.: US 10,969,847 B2
(45) Date of Patent: Apr. 6, 2021

(54) PERIPHERAL ELECTRONIC DEVICES HAVING SYNCHRONIZED OPERATING MODES

(71) Applicant: Logitech Europe S.A., Lausanne (CH)

(72) Inventor: David Tarongi Vanrell, Epalinges (CH)

(73) Assignee: Logitech Europe S.A., Lausanne (CH)

( * ) Notice: Subject to any disclaimer, the term of this patent is extended or adjusted under 35 U.S.C. 154(b) by 17 days.

(21) Appl. No.: 16/428,937

(22) Filed: May 31, 2019

(65) Prior Publication Data

US 2020/0379532 A1    Dec. 3, 2020

(51) Int. Cl.
  G06F 13/10  (2006.01)
  G06F 1/26  (2006.01)
  G06F 1/3234  (2019.01)

(52) U.S. Cl.
  CPC .............. *G06F 1/266* (2013.01); *G06F 1/325* (2013.01); *G06F 13/10* (2013.01)

(58) Field of Classification Search
  None
  See application file for complete search history.

(56) References Cited

U.S. PATENT DOCUMENTS

| | | | | |
|---|---|---|---|---|
| 7,467,313 B2* | 12/2008 | Han | .................... | G06F 1/3203 713/300 |
| 8,862,916 B2* | 10/2014 | Lee | .................... | G06F 1/266 713/320 |
| 2017/0285726 A1* | 10/2017 | Ito | .................... | G06F 1/3287 |

* cited by examiner

*Primary Examiner* — Cheng Yuan Tseng
(74) *Attorney, Agent, or Firm* — Kilpatrick Townsend and Stockton LLP

(57) ABSTRACT

A method is disclosed for synchronizing operating modes across a plurality of peripheral devices. The method includes each of the plurality of peripheral devices transmitting requests to change a rate of power consumption in response to a set of criteria for each peripheral device. A host computing device determines if one or more peripheral devices should change power modes and transmits corresponding commands to synchronize the plurality of peripheral devices into a single operating mode. Each peripheral device may have a unique power mode for a given operating mode and each peripheral device includes one or more common features, such as a lighting display, that is synchronized across all peripheral devices for a given operating mode.

20 Claims, 6 Drawing Sheets

*HOST COMPUTING DEVICE*

PERIPHERAL ELECTRONIC DEVICES HAVING SYNCHRONIZED OPERATING MODES

FIELD

The described embodiments relate generally to a plurality of peripheral electronic devices that operate in a unified manner. More particularly, the present embodiments relate to a plurality of peripheral electronic devices that synchronously transition between operating modes via a host computing device that performs bidirectional communications with each peripheral device.

BACKGROUND

Currently there are a wide variety of peripheral electronic devices that are configured to communicate with a host computing device including mice, keyboards, headsets, trackballs, speaker systems, gaming chairs and the like. Over the last few decades, the advent of wireless communication protocols like Bluetooth® and BLE® has spurred innovation in peripheral devices such that most peripheral devices have migrated from hard-wired connections to the host to wireless connections to the host. The removal of hard-wired connections has resulted in each peripheral device operating from battery power, requiring more sophisticated power management techniques to preserve the battery life. Some peripheral devices now have two, three or more different operating modes in which different systems within the peripheral device are judiciously powered off to conserve battery life. As a result, each peripheral device independently determines which operating mode to operate in which can be based on an elapsed time since the last user interaction with that particular peripheral device. This can result in one peripheral device transitioning to a lower power consumption mode (e.g., sleep mode) while the remainder of the peripheral devices remain in an active mode or visa-versa. This non-unified transition between operating modes can result in the user experiencing unexpected delays when accessing a device that "went to sleep." Further, in the case where the peripheral devices are equipped with exterior lighting schemes, the non-unified transition of peripheral devices between operating modes can result in a non-uniform change in lighting schemes, detracting from the aesthetics of the system.

BRIEF SUMMARY

In some embodiments a method for synchronizing a change in operating modes among a plurality of peripheral devices that are coupled to a host computing device, wherein each of the plurality of peripheral devices are configured to operate in one of a plurality of power modes at a given time and wherein each of the plurality of power modes corresponds to a respective rate of power consumption of the respective one of the plurality of peripheral devices comprises receiving, a signal from a first peripheral device of the plurality of peripheral devices. The signal indicates an intended change in a power mode of the first peripheral device by circuitry of the first peripheral device configured to determine, according to a first set of criteria, which power mode the first peripheral device operates within. The host device determines a power mode that a second peripheral device of the plurality of peripheral devices is operating within, wherein the second peripheral device includes circuitry configured to determine, according to a second set of criteria, which power mode the second peripheral device operates within. In response to receiving the signal and based on the power mode that the second peripheral device is operating within the host computing device transmits a command to either the first or the second peripheral device to select, regardless of the determination of the circuitry of the respective first or second peripheral device, which power mode that the first or second peripheral device operates within. The selected power mode and the power mode that the second peripheral device is operating within constitute an operating mode having an operating feature of the first and second peripheral devices.

In some embodiments the intended change in the power mode of the first peripheral device is an intended change to a higher power consumption mode, and the command to select the power mode is transmitted to the second peripheral device to enter a higher power consumption mode. In various embodiments the intended change in the power mode of the first peripheral device is an intended change to a lower power consumption mode, and the command to select the power mode is transmitted to the first peripheral device to maintain a higher power consumption mode.

In some embodiments the operating feature comprises enabling or disabling an exterior lighting scheme and the command to the first or the second peripheral device synchronizes the enabling or disabling of exterior lights across the first and the second peripheral devices. In various embodiments the operating feature comprises enabling or disabling features of at least one of the first and the second peripheral devices. In some embodiments the operating feature comprises an amount of time from when a user provides input to the first peripheral device to when the host receives data associated with the input. In some embodiments the first set of criteria includes an idle time of the device. In various embodiments the first set of criteria includes detection of a user input to the first peripheral device.

In some embodiments a system comprises one or more processors and one or more non-transitory computer-readable storage mediums containing instructions configured to cause the one or more processors to perform operations including receiving a signal from a first peripheral device of a plurality of peripheral devices indicating an intended change in a power mode of the first peripheral device by circuitry of the first peripheral device configured to determine, according to a first set of criteria, which power mode the first peripheral device operates within. The operations further include determining a power mode that a second peripheral device of the plurality of peripheral devices is operating within, wherein the second peripheral device includes circuitry configured to determine, according to a second set of criteria, which power mode the second peripheral device operates within. In response to receiving the signal and based on the power mode that the second peripheral device is operating within, a command is transmitted to either the first or the second peripheral device to select, regardless of the determination of the circuitry of the respective first or second peripheral device, which power mode that the first or second peripheral device operates within, wherein the selected power mode and the power mode that the second peripheral device is operating within constitute an operating mode having an operating feature of the first and second peripheral devices.

In some embodiments the second power mode has a higher rate of power consumption than the first power mode, and the command is transmitted to the second peripheral device and controls the power mode of the second peripheral device to change to a power mode having a higher rate of power consumption. In various embodiments the second power mode has a lower rate of power consumption than the first power mode, and the command is transmitted to the first peripheral device and controls the power mode of the first peripheral device to remain in the first power mode.

In some embodiments the operating features comprises enabling or disabling an exterior lighting scheme of each respective peripheral device, and wherein the command to either the first or the second peripheral device synchronizes the enabling or disabling of exterior lights of the first peripheral device with the second peripheral device. In various embodiments the operating features comprises enabling or disabling features of at least one of the first and the second peripheral devices. In some embodiments the operating features comprises an amount of time from when a user provides input to the first peripheral device to when the host receives data associated with the input.

In some embodiments the first peripheral device includes circuitry configured to determine the intended change according to a first set of criteria that includes an idle time of the first peripheral device. In various embodiments the first peripheral device includes circuitry configured to determine the intended change according to a first set of criteria that includes detection of a user input to the first peripheral device.

In some embodiments a non-transitory computer-program product tangibly embodied in a machine-readable non-transitory storage medium that includes instructions configured to cause one or more processors to perform operations including receiving, a signal from a first peripheral device of a plurality of peripheral devices indicating an intended change in a power mode of the first peripheral device by circuitry of the first peripheral device configured to determine, according to a first set of criteria, which power mode the first peripheral device operates within. The operations further include determining a power mode that a second peripheral device of the plurality of peripheral devices is operating within, wherein the second peripheral device includes circuitry configured to determine, according to a second set of criteria, which power mode the second peripheral device operates within. In response to receiving the signal and based on the power mode that the second peripheral device is operating within, a command is transmitted to either the first or the second peripheral device to select, regardless of the determination of the circuitry of the respective first or second peripheral device, which power mode that the first or second peripheral device operates within, wherein the selected power mode and the power mode that the second peripheral device is operating within constitute an operating mode having an operating feature of the first and second peripheral devices.

In some embodiments the intended change in the power mode of the first peripheral device is an intended change to a higher power consumption mode, and the command to select the power mode is transmitted to the second peripheral device to enter a higher power consumption mode. In various embodiments the intended change in the power mode of the first peripheral device is an intended change to a lower power consumption mode, and the command to select the power mode is transmitted to the first peripheral device to maintain a higher power consumption mode. In some embodiments the operating feature comprises enabling or disabling an exterior lighting scheme and wherein the command to the first or the second peripheral device synchronizes the enabling or disabling of exterior lights across the first and the second peripheral devices.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

DETAILED DESCRIPTION

Aspects of the present disclosure relate generally to unifying the operation of peripheral electronic devices, and more particularly to synchronizing the transition of peripheral devices between operating modes, according to certain embodiments.

In the following description, various examples of synchronizing the operation of peripheral electronic devices are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to various novel methods to synchronize the transition of operating modes between a plurality of peripheral devices that are coupled to a host computing device.

Although wireless connectivity between a host and a plurality of peripheral devices offers improved flexibility and convenience for the user, the reliance on battery power has placed demands on managing power consumption within each peripheral device. As a result, each peripheral device may transition to a new operating mode having a reduced rate of power consumption based on a user's last interaction with that specific device, although the user may still be actively using the host computer. The transition to an operating mode with a reduced rate of power consumption may result in the user experiencing an unexpected delay when resuming interaction with a peripheral device that has, for example, entered a "sleep mode." Further, when each peripheral device independently transitions to a new operating mode, an exterior illumination scheme for each peripheral device may change independent of the other peripheral devices, resulting in a disjunctive appearance to the user.

Figure 1:
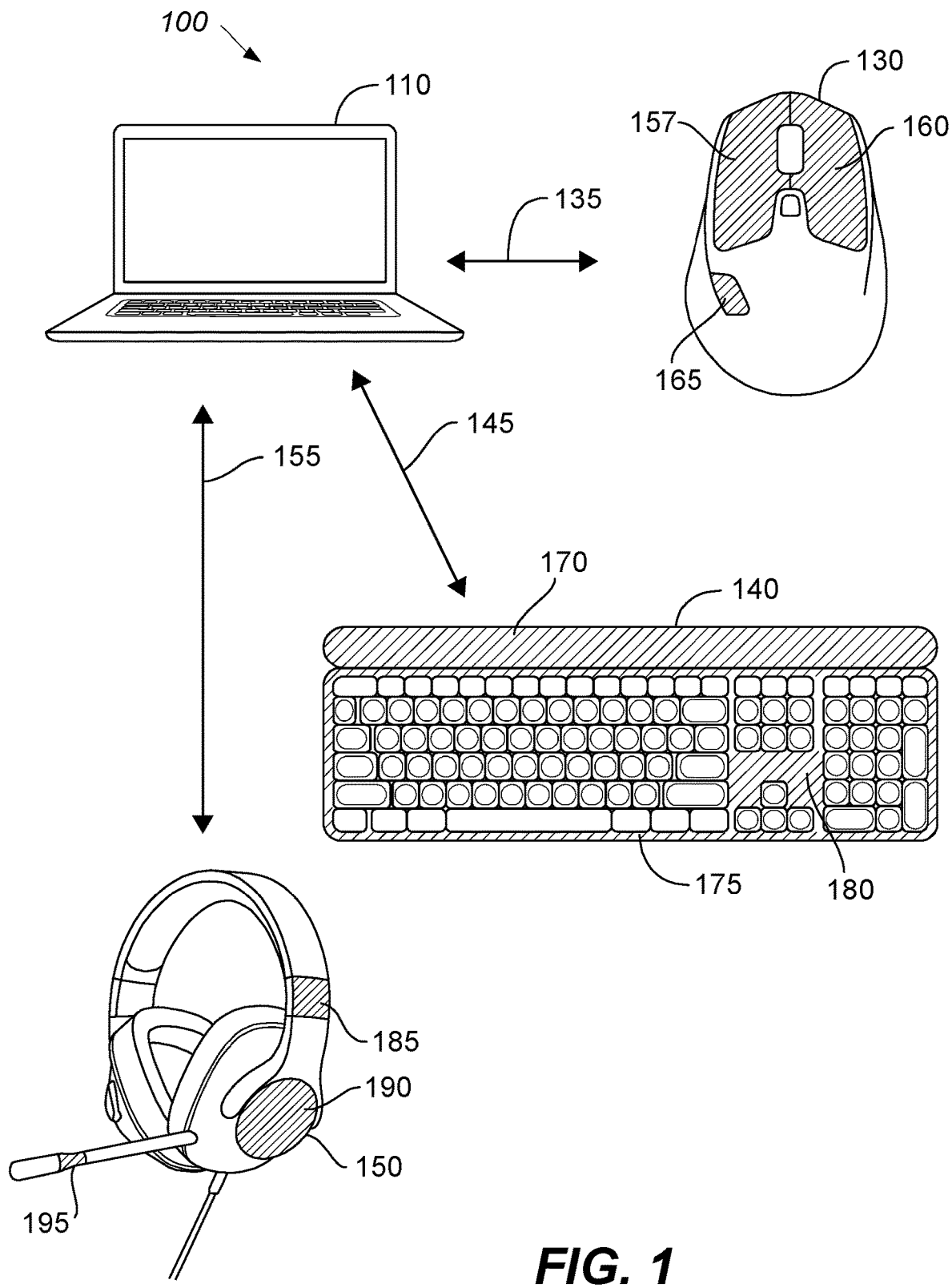
FIG. 1 illustrates a host computing device coupled to a plurality of peripheral devices, according to certain embodiments.

Within this disclosure methods are disclosed that enable a plurality of peripheral devices to synchronously transition between operating modes via a host computing device that performs bidirectional communications with each peripheral device. More specifically, methods are disclosed that require a plurality of peripheral devices to transition operating modes synchronously. An example host computing device and a plurality of communicatively coupled peripheral devices are illustrated in FIG. 1. As described in FIG. 2 a method of operation for each peripheral device requires each peripheral device to notify the host when it is ready to transition to an operating mode having a reduced rate of power consumption.

As described in FIG. 4 a method of operation for the host computing device requires that a plurality of peripherals notify the host that they are ready to change a rate of power consumption before the host simultaneously commands the plurality of peripheral devices to transition to a new operating mode. In some embodiments the plurality of peripheral device may comprise all the peripheral devices coupled to the host while in other embodiments the plurality of peripheral devices may comprise a subset of all peripheral devices coupled to the host. The methods described in FIGS. 2 and 4 require that if at any time at least one of the peripheral devices is in use, that the other peripheral devices remain in the current operating mode. The methods further require that if at any time after all peripheral devices have transitioned to an operating mode having a reduced rate of power consumption, if any peripheral device is used by the user, the host commands all of the peripheral devices to transition back to a normal operating mode. In this way all peripheral devices transition between operating modes synchronously. Further, when the peripheral devices are equipped with illuminated regions (as shown in FIGS. 1 and 5) the illumination schemes can be also be coordinated during transition between operating modes such that the peripheral devices have synchronized illumination.

Figure 5:
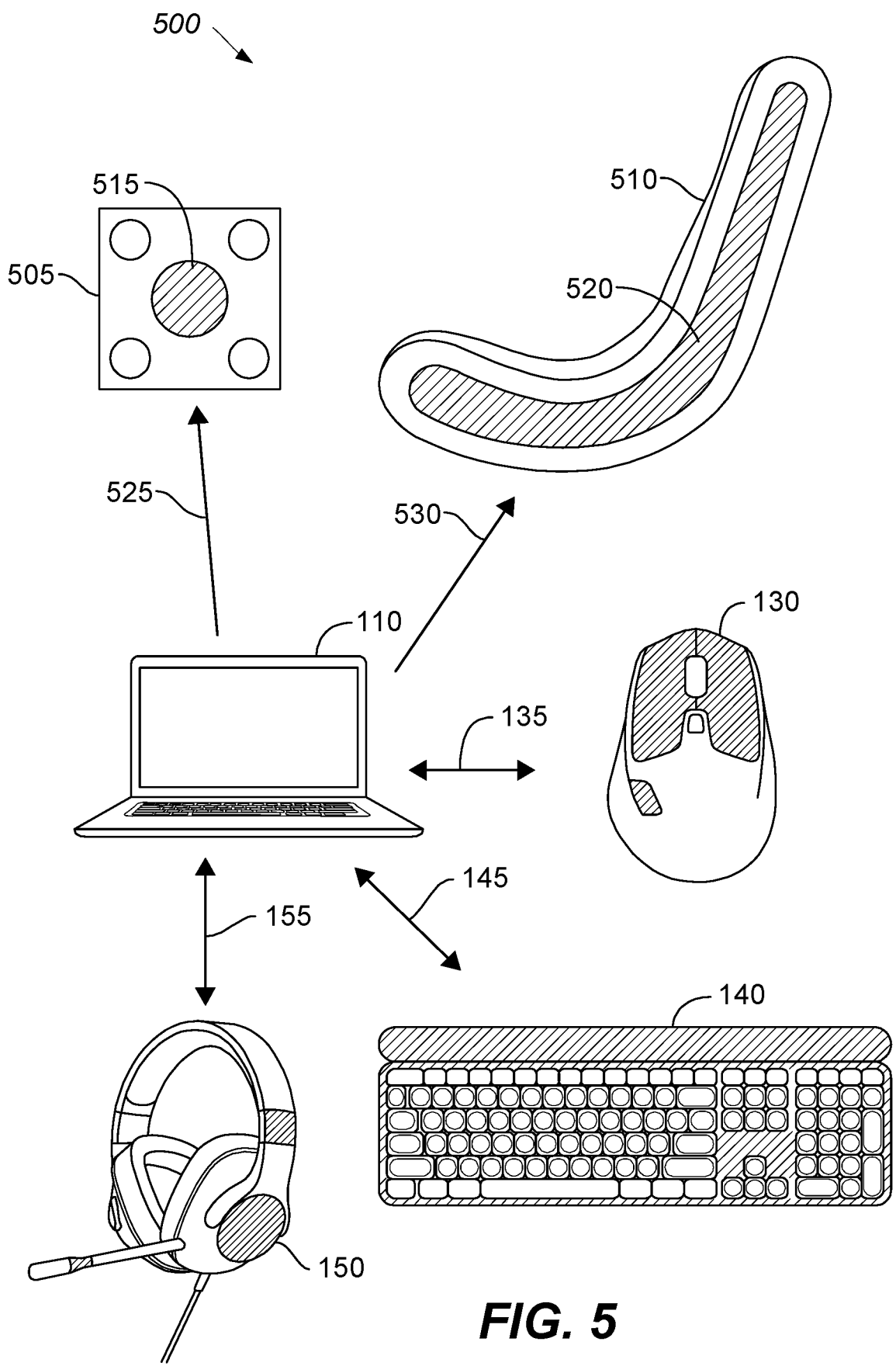
FIG. 5 illustrates a host computing device coupled to a plurality of peripheral devices, according to certain embodiments.

In other embodiments one or more of the peripheral devices may be "passive," as shown in FIG. 5 such that they can only follow operating mode transitions via commands from the host. As such, "passive" devices cannot send input to the host and have no effect on the host's decision to transition operating modes. These and other various embodiments are described in more detail below.

FIG. 1 illustrates a system 100 including host computing device 110 that can be coupled to a plurality of peripheral electronic devices 130, 140, 150, according to certain embodiments. Host computing device 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, one of skill in the art will appreciate that multiple computing devices may be used in the embodiments that follow. For example, each peripheral device 130, 140, 150 may be coupled to multiple host computing devices (e.g., but one at a time).

Peripheral devices 130, 140, 150 can be any suitable computer peripheral device, however the examples shown here are typically found in conventional gaming systems. For instance, peripheral device 130 may be a computer mouse, peripheral device 140 can be a keyboard, and peripheral device 150 can be an audio headset with or without a microphone. Peripheral devices 130, 140, 150 can be synchronized with one another via host computer 110, as described in more detail below. Peripheral devices 130, 140, 150 can perform bidirectional communications with host computing device 110 using wired or wireless communications via communications paths 135, 145, 155. One of ordinary skill in the art with the benefit of this disclosure would appreciate the many modifications, variations, and alternative embodiments thereof.

In some embodiments each peripheral device 130, 140, 150 may have one or more operating modes that are each associated with a different rate of power consumption and may also be associated with other operations of the device, such as, for example, an exterior lighting scheme, a delay between a user interaction with the device and when the device transmits data associated with the user interaction to the host, etc. Multiple rates of power consumption may be particularly useful for wireless peripheral devices to maximize battery life. For example, peripheral device 130 is a mouse and may have a first power mode that turns off optical tracking "Optical Off Mode," a second power mode that suspends transmit and receive operations to the host computer "Reduced Operating mode" and a third power mode that entirely shuts the mouse down, including exterior illumination "Power Off Mode." In some embodiments a peripheral device may have more power modes than operating modes and as such some peripheral devices can change power modes without being commanded to a new operating mode. For example, mouse 130 can have two operating modes (e.g., sleep and active) while it can have the three power modes described above where the Optical Off Mode can be enabled by the mouse itself without receiving a command from the host.

Similarly, peripheral device 140 is a keyboard that may have a first power mode "Reduced Operating mode" that suspends transmit and receive operations to the host computer and a second power mode "Power Off Mode" that entirely shuts the keyboard down, including exterior illumination. Peripheral device 150 is an audio headset that may have a first power mode "Reduced Operating mode" that suspends transmit and receive operations to the host computer and a second power mode "Power Off Mode" that entirely shuts the headset down including exterior illumination. One of ordinary skill in the art with the benefit of this disclosure would appreciate the many modifications, variations, and alternative embodiments of different power modes and power-saving schemes that could be used in addition to those described above. As described herein, host computing device 110 can judiciously and synchronously transition all three peripheral devices 130, 140, 150 between operating modes wherein each operating mode is associated with a rate of power consumption for each respective device, such that all peripheral devices are in a similar state of readiness (e.g., active, sleep, off).

Host computing device 110 may be used to synchronize the operating modes of peripheral devices 130, 140, 150 such that all peripheral devices transition into and out of each operating mode at the same time, as described in more detail below. The synchronization of operating modes across the plurality of peripheral devices may enable a user who is actively using only one peripheral device to not experience an unexpected delay when transitioning to the a different peripheral device. Further, the synchronized transition of the plurality of peripheral devices between operating modes may enable an enhanced user experience and improved aesthetics of the system, which may be particularly beneficial when all peripheral devices have synchronized illumination schemes, as described in more detail below.

For example, as shown in FIG. 1, peripheral device 130 is a mouse and includes illuminated regions 157, 160, 165. Similarly, peripheral device 140 is a keyboard and includes illuminated regions 170, 175, 180. Peripheral device 150 is an audio headset and can include illuminated regions 185, 190, 195. Each peripheral device 130, 140, 150 may display a color, color pattern or sequence of colors on the respective illuminated regions that are synchronized, making all of the peripheral devices appear unified.

For example, when in the same operating mode, the illuminated regions of each peripheral device can transition from blue to red at the same time. In another example, a synchronized sequence of colors can appear to move across each illuminated region of each peripheral electronic device making all the devices appear to breathe or pulse at the same rate using the same sequence of colors. Further, when transitioning between operating modes each electronic device can simultaneously indicate the transition by exhibiting the same change in illumination scheme. For example, when transitioning to an operating mode having a reduced rate of power consumption each peripheral device may transition from changing colors at a rate of 5 changes per second and after changing to the reduced operating mode each peripheral device may change colors at a rate of 1 change per second to indicate the synchronous transition of all devices to the reduced rate of power consumption. In further embodiments delays between specific peripherals and the host and/or delays for each device to illuminate can be accounted for by the host or by the peripheral device so each peripheral device is synchronously illuminated. Thus, the plurality of peripheral devices appear and act as one synchronized system, as described in more detail below.

Figure 2:
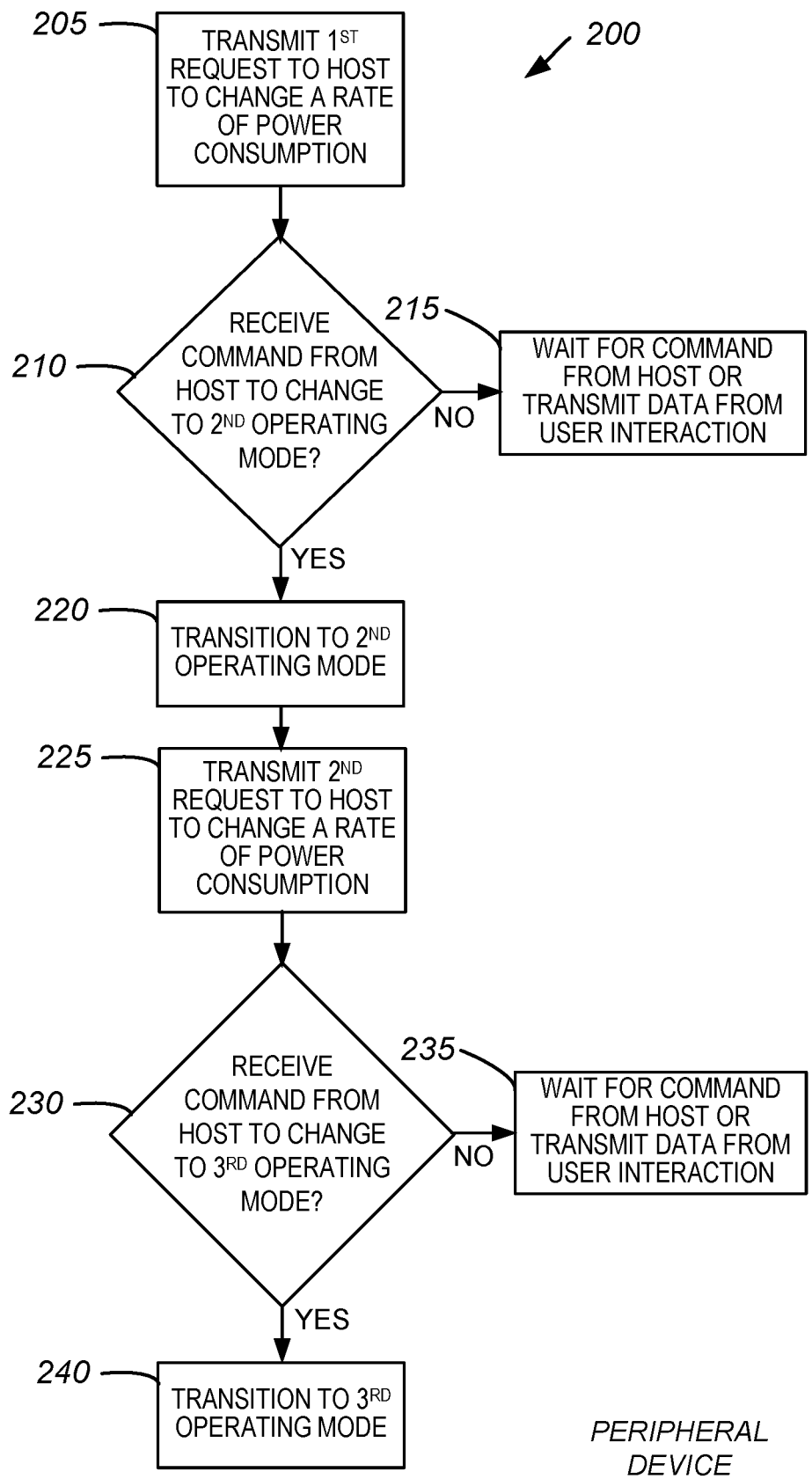
FIG. 2 illustrates a method of operation for a peripheral device to synchronize transitioning between operating modes with other peripheral devices, according to certain embodiments.
Figure 3:
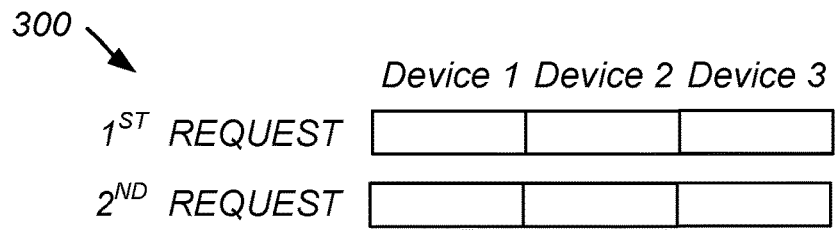
FIG. 3 illustrates a simplified graphical depiction of a register used by a host computing device to track requests from each peripheral device to transition between operating modes, according to certain embodiments.

FIG. 2 illustrates a simplified flow diagram for a method of operation 200 of an example peripheral device, according to certain embodiments. Method 200 is used by each peripheral device in this particular example, such as peripheral devices 130, 140 and 150 illustrated in FIG. 1 to transition between an active first operating mode, a reduced rate of power consumption second operating mode (e.g., a sleep mode) and a further reduced rate of power consumption third operating mode (e.g., an off mode). FIG. 3 illustrates a simplified graphical illustration of a peripheral device operating mode request register 300 that can be used by the host computing device. FIG. 4 illustrates a simplified flow diagram for a method of operation 400 of an example host computing device, according to certain embodiments. Method 400 is used by the host to synchronize the operation of a plurality of peripheral devices. FIGS. 3, 4 and 5 will be referred to simultaneously in the discussion below.

In step 205 of method 200 of FIG. 2, a peripheral device transmits a request to a host computing device to change a rate of power consumption. In some embodiments the peripheral device transmits the request only after a predetermined period of no user interaction with that particular device has occurred. For example for peripheral device 130 (see FIG. 1) the predetermined period of no user interaction with the mouse may be two minutes. Therefore, if the user has not interacted with peripheral device 130 within the last two minutes the peripheral device will transmit the request to change a rate of power consumption (e.g., a sleep mode) to the host computing device. In other embodiments the peripheral device transmits the request to the host to change a rate of power consumption in response to, for example, a device time out, a loss of a proximity detection of a user (e.g., via a dedicated sensor in a webcam or other peripheral), a recognition of an audible key word, a specific "hot key" or operating mode selection button being depressed on the host or a peripheral device that commands a change in operating modes, etc.

In some embodiments each peripheral device may only communicate with the host device when the predetermined period of no user interaction with the peripheral device has occurred, rather than repeatedly updating the host computing device at regular intervals (e.g., every 30 seconds). The reduced number of communications can reduce power consumption for the peripheral device and minimize communication traffic between the host and the peripheral devices.

As described above, method 200 can be performed by each peripheral device. Therefore, following the example computing configuration of FIG. 1, method 200 is performed by peripheral devices 130, 140 and 150. As each peripheral device transmits a request to the host computing device to transition to a reduced rate of power consumption, the host computing device can collect these requests in memory, which is graphically represented in FIG. 3 as a register 300.

Now referring to register 300, host computing device collects requests from each peripheral device (e.g., peripheral devices 130, 140, 150 in FIG. 1) in the register. The host computing device does not take any action until all three peripheral devices have transmitted a request change a rate of power consumption. If at any time one of the peripheral devices is used by the user, that peripheral device immediately sends a command to the host computing device, clearing that peripheral device's request in register 300, if one was present. In some embodiments the command from the peripheral device includes data from the user interaction with the peripheral device (e.g., a mouse click) that the host device may process and act on. In this way, the peripheral devices function synchronously such that none of the peripheral devices can transition to a new operating mode unless all of the peripheral devices have transmitted requests to the host computing device.

Now referring to method 400 (see FIG. 4) of the host computing device, in step 405 the host computing device examines register 300 (see FIG. 3) to determine if all peripheral devices have transmitted requests to change a rate of power consumption. If all peripheral devices have not transmitted requests to change a rate of power consumption then host computing device proceeds to step 410 in which it waits for all peripheral devices to transmit requests.

If all peripheral devices have transmitted requests to change a rate of power consumption then the host computing device proceeds to step 415 in which the host computing device transmits a command to all peripheral devices to transition to a second operating mode. In some embodiments, in which the peripheral devices are wireless devices, the command may be sent via wireless protocol, and in embodiments in which the peripheral devices are wired, the command may be sent via wired protocol.

In step 210 of method 200 in FIG. 2, each peripheral device determines whether it has received a command from the host to change operating modes.

In step 215 if the peripheral device has sent a request to change a rate of power consumption but has not received a command from the host device to transition to the second operating mode the peripheral device waits to transition to the second operating mode. Further, if a user interacts with the peripheral device before the peripheral device receives a command to enter the second operating mode from the host then the peripheral device transmits data associated with the user interaction to the host, which then clears that peripheral device's request to change a rate of power consumption from register 300 (see FIG. 3).

In step 215 if the peripheral device has sent a request to change a rate of power consumption and receives a command from the host device to transition to the second operating mode, method 200 proceeds to step 220 in which each peripheral device changes to the second operating mode. As described above, all peripheral devices must have a period of no use by the user before the peripheral devices all transition to a new operating mode. In this way if the user is still using the system the user will not experience a delay when using any of the peripheral devices.

In some embodiments when transitioning to the second operating mode each peripheral device may have its own particular power mode that it transitions to effectuating a change in a rate of power consumption. In one embodiment all peripheral devices transition to a sleep mode in which a rate of power consumption is reduced.

In some embodiments each operating mode may have an associated exterior illumination scheme that each peripheral device follows. That is, each peripheral device, when transitioning to the second operating mode, may change an exterior illumination scheme synchronously with the other peripheral devices. In one example when transitioning to the second operating mode each peripheral device may transition from changing colors at a rate of five colors per second to changing colors at a rate of one color per second to indicate the synchronous transition of all devices to the second operating mode.

The synchronous transition of colors by all peripheral devices may be aesthetically pleasing to the user and give the user the appearance that all of the peripheral devices are operating as a unified single system. In further embodiments when the host computing device transmits the command to transition to the second operating mode, the host computing device can also transmit the particular illumination scheme to be used by each peripheral device. However, in other embodiments the exterior illumination schemes associated with each operating mode may be preprogrammed in the host device and in all of the peripheral devices.

If each peripheral device has transitioned to a second operating mode in step 220, each peripheral device proceeds to step 225. In step 225 each peripheral device waits a predetermined time with no user interaction before transmitting a request to the host computing device to reduce a rate of power consumption. More specifically, in some embodiments, after a second predetermined period of time that is longer than the first predetermined period of time for the second operating mode, each peripheral device may send a request to the host computing device to make another change to a rate of power consumption (e.g., enter an off mode). In one example each peripheral device may have a first predetermined time of two minutes to enter the second operating mode and may have a second predetermined period of time of ten minutes to enter the third operating mode.

Now referring to register 300 in FIG. 3, the host computing device collects the second requests to change a rate of power consumption from all peripheral devices (e.g., peripheral devices 130, 140, 150 of FIG. 1) in a similar fashion as described above with regard to the first collection of reduced power consumption requests. The host computing device does not take any action until all three peripheral devices have transmitted a request to reduce a rate of power consumption. If at any time one of the peripheral devices is used by the user, that peripheral device immediately sends a command to the host computing device, clearing that peripheral device's request in register 300, if one was present.

In some embodiments the command from the peripheral device includes data from the user interaction with the peripheral device (e.g., a mouse click) that the host device may process and act on. In this way, the peripheral devices function synchronously such that none of the peripheral devices can transition to the third operating mode unless all of the peripheral devices have transmitted requests to the host computing device to reduce a rate of power consumption.

Now referring to method 400 (see FIG. 4) for the host computing device, in step 420 the host computing device examines register 300 (see FIG. 3) to determine if all peripheral devices have transmitted second requests to change a rate of power consumption. If all peripheral devices have not transmitted requests to change a rate of power consumption then the host computing device proceeds to step 425 in which it waits for all peripheral devices to transmit requests.

If all peripheral devices have transmitted requests, method 400 proceeds to step 430 in which the host computing device sends out a command to all peripheral devices to transition to the a third operating mode. In some embodiments where the peripheral devices are wireless the command may be sent via wireless protocol and in embodiments where the peripheral devices are wired the command may be sent via wired protocol.

In step 230 of method 200 in FIG. 2, if the peripheral device has not received a command from the host computing device to transition to the third operating mode then the method proceeds to step 235 where the peripheral device either receives user input and transitions to the first operating mode (from the second operating mode) or waits for a command from the host computing device.

In step 230, if the peripheral device has received a command from the host computing device to transition to the third operating mode, method 200 proceeds to step 240 in which the peripheral device enters the third operating mode. In some embodiments each peripheral device, when transitioning to the third power mode, may change an exterior illumination scheme synchronously with the other peripheral devices. In one example when transitioning to the third operating mode each peripheral device may slowly dim a particular color until the illumination is completely ceased, to indicate the synchronous transition of all devices to, for example, a power off mode. The synchronous transition may be aesthetically pleasing to the user and give the user the appearance that all of the peripheral devices are operating as a unified system. In further embodiments when the host computing device transmits the command to transition to the third operating mode the host computing device can also transmit the illumination scheme to be used by each peripheral device, however in other embodiments the exterior illumination scheme may be preprogrammed in the host device and all of the peripheral devices.

As described above, if at any time a user interacts with any peripheral device, that peripheral device responds by transmitting data to the host computing device. The host computing device then transmits a command to all of the peripheral devices to transition to the first operating mode (e.g., an active mode), assuming they were in the second or third operating modes, and all peripheral devices synchronously transition to the first operating mode. In some embodiments when transitioning to the first operating mode all peripheral devices may display a synchronized illumination scheme. For example, if the peripheral devices are in a second operating mode the exterior illumination scheme may be a color change at a rate of once per second, however when the user interacts with any peripheral device all peripheral devices may transition to an exterior illumination scheme having a color change rate of 5 times per second to indicate that all peripheral devices are now in the first operating mode.

In some embodiments, a peripheral device may have more power modes than other peripheral devices have. For example a mouse may have a reduced power mode in which it turns off an optical tracking system after one minute of no user interaction, in addition to a low power mode in which all transmit and receive operations to the host are ceased and an off power mode in which all systems within the mouse are powered off. In some embodiments the amount of delay a user may experience from this "additional" power mode may be negligible and as such the transition of the mouse to the additional power mode may not be communicated to the host computing system. That is, in some embodiments a peripheral device may transition to a new power mode without requiring a command from the host computing device to transition to a new operating mode.

In some embodiments each peripheral device may have a different predetermined time period of no user interaction that must expire before it transmits a request to the host computing device to reduce a rate of power consumption. In one example a mouse has a two minute predetermined time period transmit a request, a keyboard has a three minute predetermined time period and an audio headset has a four minute predetermined time period.

Figure 4A:
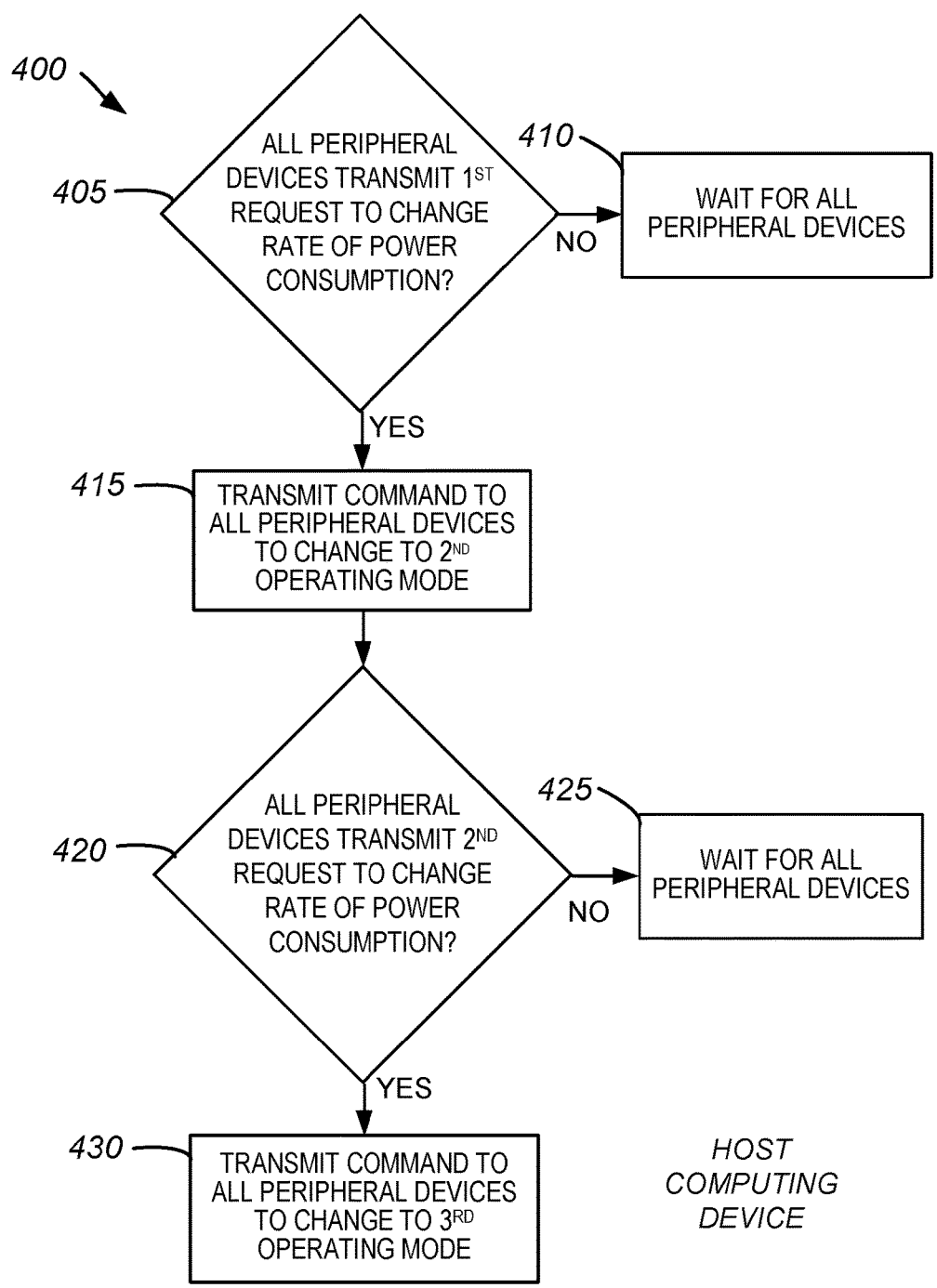
FIGS. 4A, 4B illustrate methods of operation for a host computing device to communicate with a plurality of peripheral electronic devices and synchronize the transition of the plurality of peripheral electronic devices between operating modes, according to certain embodiments.
Figure 4B:
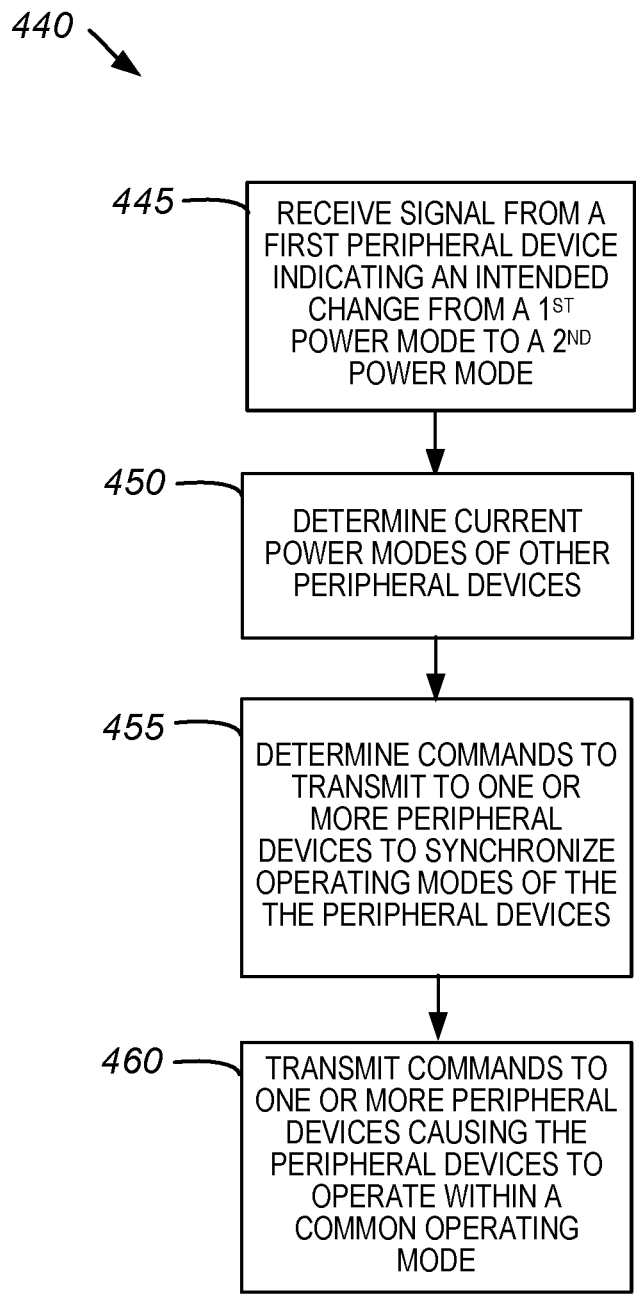

FIG. 4B illustrates a simplified flow diagram for an alternative method of operation 440 of an example host computing device, according to certain embodiments. Method 440 can be used by a host in a similar fashion as method 400 to synchronizing a change in operating modes among a plurality of peripheral devices that are coupled to the host computing device. In some embodiments each of the plurality of peripheral devices are configured to operate in one of a plurality of power modes at a given time wherein each of the plurality of power modes corresponds to a respective rate of power consumption of the respective one of the plurality of peripheral devices.

Now referring to method 440 (see FIG. 4B) of the host computing device, in step 445 the host computing device receives a signal from a first peripheral device indicating that the first peripheral device intends to change from a first power mode to a second power mode. In some embodiments the first peripheral device may have internal circuitry that responds to a first set of criteria to determine which operating mode to transition to. In one embodiment an absence of user input for a predetermined period of time can cause the circuitry to transmit a request to the host computing device to transition to a second power mode associated with a reduced rate of power consumption. In other embodiments the peripheral device may request to transition to a second power mode having a higher rate of power consumption. In some embodiments a host device may determine power modes for a particular peripheral device by receiving information directly from the peripheral device, receiving a model or similar identifier from the device or characterizing the device, for example, via an API that enables changing power states by the host. As would be appreciated by one of skill in the art these features can apply to any embodiment or method disclosed herein, including method 200 in FIG. 2 and method 400 in FIG. 4A.

In step 450 the host device determines the current power modes of other peripheral devices. In one embodiment, as described in FIG. 3, the host computing device may have a register that keeps track of the power modes and power mode requests of each connected peripheral device. In other embodiments the host may poll each peripheral device to determine its current power mode and in further embodiments it can also poll for each device's intended power mode that it intends to transition to. In further embodiments the host can have one or more internal timers that it employs to determine if a particular peripheral device would still be active based on a time from a previous transmission received from the peripheral device. In some embodiments each peripheral device includes circuitry that use a set of criteria to determine which power mode the peripheral device is operating in and which power mode the peripheral device should transition to. As would be appreciated by one of skill in the art these features can apply to any embodiment or method disclosed herein, including method 200 in FIG. 2 and method 400 in FIG. 4A.

In step 455 the host determines an associated set of commands to be transmitted to one or more of the peripheral devices to synchronize an operating mode of the peripheral devices. In some embodiments only a subset of the peripheral devices will need to change a state of operation to be synchronized. In other embodiments each peripheral device will need to change a state of operation to remain in a synchronized operating mode with the other peripheral devices. In one embodiment all peripheral devices will transition from, for example, an active mode to a sleep mode in which the lighting scheme of each peripheral device will synchronously change as a result of the change in operating modes.

In some embodiments the host device can use information received from one or more peripheral devices and based on the power mode that each device is operating in, the host may generate a command operable to cause each peripheral device to switch (or stay) in an active state in response to detecting a user input at any one of the peripheral devices. In some embodiments the commands can be determined regardless of the peripheral device circuitry and in further embodiments regardless of which power mode one or more of the peripheral devices is currently operating in. For example, in one embodiment, regardless of the power mode each device is operating in the host commands each device into an active state in response to a user input at one of the peripheral devices.

In step 460, the host device transmits appropriate commands to one or more peripheral devices causing the peripheral devices to all operate within a common operating mode. In some embodiments the common operating mode may have a common power mode for each peripheral device while in other embodiments it may have a common lighting scheme and in further embodiments it may have a common change in delay from a user input to the peripheral device to a time the host receives data associated with the input. In other embodiments each peripheral device may have a unique power mode although each peripheral device is operating in a common operating mode.

It will be appreciated that methods 200, 400 and 440 in FIGS. 2, 4A and 4B, respectively, are illustrative and that variations and modifications are possible. Steps described as sequential may be executed in parallel, order of steps may be varied, and steps may be modified, combined, added or omitted. The various embodiments described in reference to FIGS. 2-4B can be combined wholly or in part. In one example method 440 in FIG. 4B can employ register 300 illustrated in FIG. 3 to track a status of a power mode of each peripheral device when determining which commands to send to each peripheral device. Further, the first, second and third operating modes described herein are for example only and there may be additional or different modes, as would be appreciated by one of skill in the art with the benefit of this disclosure.

FIG. 5 illustrates a system 500 that is similar to system 100 illustrated in FIG. 1, however system 500 includes two "passive" peripheral devices including a speaker system 505 and a gaming chair 510. Speaker system 505 may include an illumination panel 515 and may be configured to receive data from host computing device 110 via unidirectional communication path 525, but may not be configured to transmit data to the host computing device. In one embodiment, speaker system 505 may emit an audible tone, tune or sound when transitioning between operating modes. Similarly, gaming chair 510, may include an illumination panel 520 and may be configured to receive data from host computing device 110 via unidirectional communication path 530, but may not be configured to transmit data to host computing device 110. In one embodiment gaming chair 510 may vibrate or employ other haptics to notify a user of a transition between operating modes. In further embodiments, any peripheral device may employ audible sounds or haptics to notify a user of a transition between operating modes.

System 500 may function similar to system 100 as described herein using methods 200 and 400 described in FIGS. 2 and 4, respectively, however passive peripheral devices 505, 510 may not transmit data to host 110 and therefore host 110 may not consider a user's interaction with them when determining whether or not to send a command to all peripheral devices to change to a new operating mode. Host computing device 110 may only use inputs from active peripheral devices 130, 140, 150 that have bidirectional communication paths (e.g., 135, 145, 155) with the host computing device to make operating mode transition decisions. However, passive peripheral devices 505, 510 may be configured to receive operating mode transition commands from host device 110 and may change operating modes synchronously with the active peripheral devices 130, 140, 150. Further, passive peripheral devices 505, 510 may receive illumination schemes from host computing device 110 as a part of each operating mode and may be synchronously illuminated with active peripheral devices 130, 140, 150.

A person of skill in the art will appreciate that in some embodiments communications coordinating the change in operating modes among a plurality of peripheral devices may not need to be processed by a traditional "host-type" computing device and a mesh network or other device can process the peripheral device communications. More specifically, in some embodiments each peripheral device may have an on-board processor and may be capable of communicating with the other peripheral devices and following the same methods 200 and 400 described in FIGS. 2 and 4, respectively, to determine when each device has not had a user interaction for a predetermined period of time and as a result transition between operating modes. In some embodiments this may be known as a mesh network of peripheral devices. In other embodiments one peripheral device may be a "master" and receive inputs from the other peripheral devices, then in response, transmit commands to all of the peripheral devices, including itself, to transition between operating modes. In further embodiments there may be a separate "hub" that receives requests from and transmits commands to each peripheral device according to methods 200 and 400 describe in FIGS. 2, and 4, respectively. That is, more specifically, in some embodiments the methods described herein may not need a "traditional host-type" computing device, such as, for example a desktop or laptop, and any other system with a processor can be used to synchronize operating modes among a plurality of peripheral devices.

A person of skill in the art will also appreciate that with the knowledge of this disclosure other methods of synchronously transitioning the plurality of peripheral devices between operating modes can be used. For example, a user can depress a particular key on a keyboard and the host device can, in response, transmit a command to all peripheral devices to transition to a new operating mode and all of the peripheral devices synchronously transition.

Figure 6:
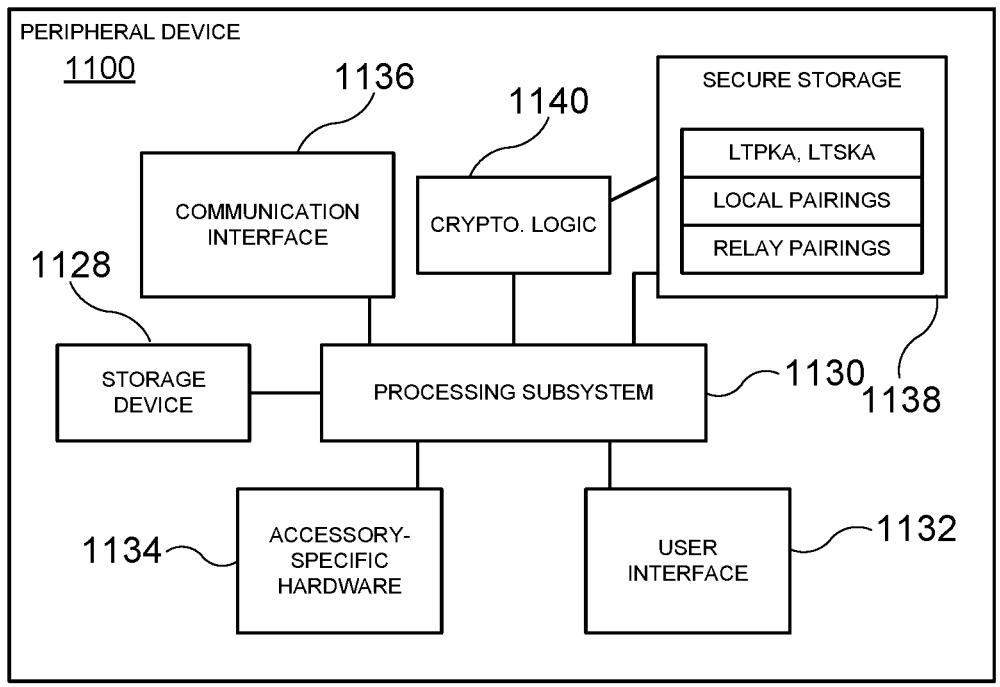
FIG. 6 illustrates a simplified block diagram of an example peripheral device, according to certain embodiments.

FIG. 6 shows a simplified block diagram of an example peripheral device 1100, according to certain embodiments, and may represent features and functions of any peripheral device, for example peripheral devices 130, 140, 150 illustrated in FIG. 1. Peripheral device 1100 can implement any or all of the peripheral device functions, behaviors, and capabilities described herein, as well as other functions, behaviors, and capabilities not expressly described. Peripheral device 1100 can include storage device 1128, processing subsystem 1130, user interface 1132, peripheral device-specific hardware 1134, communication interface 1136, secure storage module 1138, and cryptographic logic module 1140. Peripheral device 1100 can also include other components (not explicitly shown) such as a battery, power media access devices, and other components operable to provide various enhanced capabilities.

Peripheral device 1100 is representative of a broad class of devices that can be used in conjunction with a host device such as but not limited to mice, keyboards, audio headsets, cameras, conferencing systems, printers and the like. Various accessories may include components not explicitly shown in FIG. 1, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1128 can be implemented, e.g., using disk, flash memory, or any other non-transitory storage medium, or a combination of media, and can include volatile and/or non-volatile media. In some embodiments, storage device 1128 can store one or more programs (e.g., firmware) to be executed by processing subsystem 1130, including programs to implement various operations described above as being performed by a peripheral device, as well as operations related to particular peripheral device behaviors. Storage device 1128 can also store a peripheral device object or peripheral device definition record that can be furnished to host devices, e.g., during device discovery. Storage device 1128 can also store peripheral device state information and any other data that may be used during operation of peripheral device 1100. Storage device 1128 can also store program code executable to communicate with a transceiver 1205, as shown in FIG. 1, e.g., as described above.

Processing subsystem 1130 can include, e.g., one or more single-core or multi-core microprocessors and/or microcontrollers executing program code to perform various functions associated with peripheral device 1100. For example, processing subsystem 1130 can implement various processes (or portions thereof) described above as being implemented by a peripheral device, e.g., by executing program code stored in storage device 1128. Processing subsystem 1130 can also execute other programs to control other functions of peripheral device 1100. In some instances programs executed by processing subsystem 1130 can interact with a host (e.g., host 110 in FIG. 1), e.g., by generating messages to be sent to the host and/or receiving messages from the host. In some instances, the messages can be sent and/or received using a transceiver 1205, as shown in FIG. 1, as described above.

User interface 1132 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1100, a user can operate input devices of user interface 1132 to invoke functionality of peripheral device 1100 and can view and/or hear output from peripheral device 1100 via output devices of user interface 1132. Some accessories may provide a minimal or no user interface. Where the peripheral device does not have a user interface, a user can still interact with the peripheral device using a host (e.g., host 1200).

Peripheral device-specific hardware 1134 can include any other components that may be present in peripheral device 1100 to enable its functionality. For example, in various embodiments peripheral device-specific hardware 1134 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1134 and that peripheral device-specific hardware can include mechanical as well as electrical or electronic components.

Communication interface 1136 can provide voice and/or data communication capability for peripheral device 1100. In some embodiments communication interface 1136 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1136 can provide wired network connectivity (e.g., Ethernet) in addition to or instead of a wireless interface. Communication interface 1136 can be implemented using a combination of hardware (e.g., driver circuits, antennas, modulators/demodulators, encoders/decoders, and other analog and/or digital signal processing circuits) and software components. In some embodiments, communication interface 1136 can support multiple communication channels concurrently or at different times, using the same transport or different transports.

Thus, for example, peripheral device 1100 can communicate with a host via a local channel at some times and via a relay service at other times.

Secure storage module 1138 can be an integrated circuit or the like that can securely store cryptographic information for peripheral device 1100. Examples of information that can be stored within secure storage module 1138 include the peripheral device's long-term public and secret keys 1142 (LTPKA, LTSKA), a list of local pairings 1144 (e.g., a lookup table that maps a local host identifier to a host long-term public key (LTPKC) for hosts that have completed a local pair setup or pair add process, e.g., as described above, with peripheral device 1100), and a list of relay pairings 1146 (e.g., host RAs and associated access tokens for hosts that have established a relay pairing, e.g., as described above, with peripheral device 1100). In some embodiments, pairing information can be stored such that a local pairing 1144 is mapped to the corresponding relay pairing 1146 in instances where both a local pairing and a relay pairing with the host have been established. In some embodiments, secure storage module 1138 can be omitted; keys and lists of paired hosts can be stored in storage device 1128.

In some embodiments, cryptographic operations can be implemented in a cryptographic logic module 1140 that communicates with secure storage module 1138. Physically, cryptographic logic module 1140 can be implemented in the same integrated circuit with secure storage module 1138 or a different integrated circuit (e.g., a processor in processing subsystem 1130) as desired. Cryptographic logic module 1140 can include various logic circuits (fixed or programmable as desired) that implement or support cryptographic operations of peripheral device 1100, including any or all cryptographic operations described above. Secure storage module 1138 and/or cryptographic logic module 1140 can appear as a "black box" to the rest of peripheral device 1100. Thus, for instance, communication interface 1136 can receive a message in encrypted form that it cannot decrypt and can simply deliver the message to processing subsystem 1130. Processing subsystem 1130 may also be unable to decrypt the message, but it can recognize the message as encrypted and deliver it to cryptographic logic module 1140. Cryptographic logic module 1140 can decrypt the message (e.g., using information extracted from secure storage module 1138) and determine what information to return to processing subsystem 1130. As a result, certain information can be available only within secure storage module 1138 and cryptographic logic module 1140. If secure storage module 1138 and cryptographic logic module 1140 are implemented on a single integrated circuit that executes code only from an internal secure repository, this can make extraction of the information extremely difficult, which can provide a high degree of security. Other implementations are also possible.

Peripheral device 1100 can be any electronic apparatus that interacts with host 1200. In some embodiments, host 1200 can provide remote control over operations of peripheral device 1100 as described below. For example host 1200 can provide a remote user interface for peripheral device 1100 that can include both input and output controls (e.g., a display screen to display current status information obtained from peripheral device 1100 and an input control such as a touchscreen overlay to allow changes to the status information). Host 1200 in various embodiments can control any function of peripheral device 1100 and can also receive data from peripheral device 1100, via a transceiver 120, as shown in FIG. 1.

Figure 7:
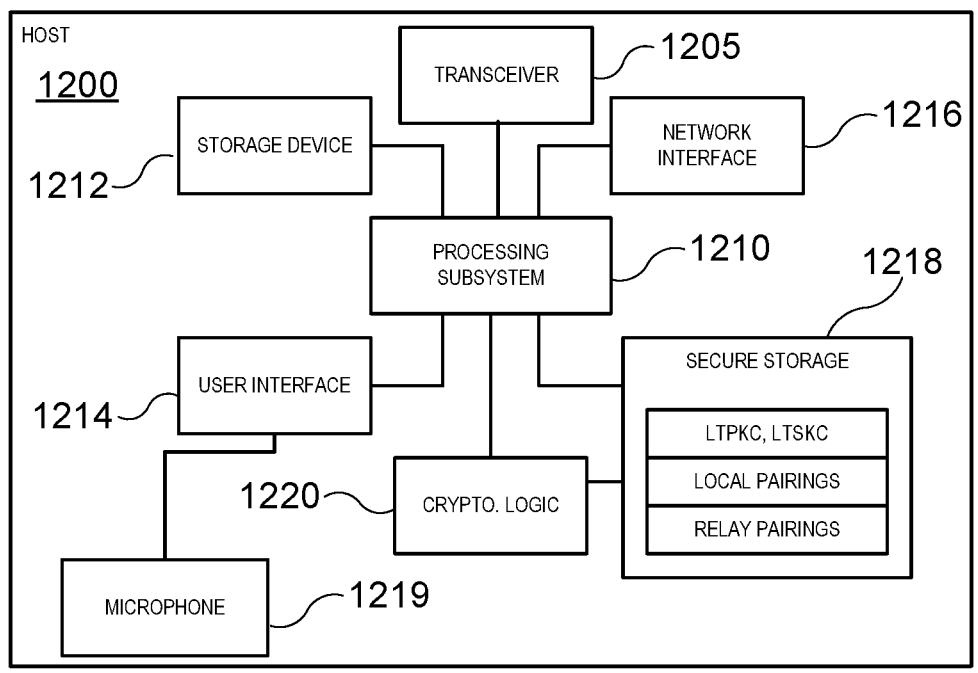
FIG. 7 illustrates a simplified block diagram of an example host computing device, according to certain embodiments.

FIG. 7 shows a simplified block diagram of an example host 1200, which may be illustrative of the features and functions of host device 110 illustrated in FIG. 1, according to certain embodiments. In some embodiments, host 1200 can implement any or all of the functions, behaviors, and capabilities described herein as being performed by a host, as well as other functions, behaviors, and capabilities not expressly described. Host 1200 can include processing subsystem 1210, storage device 1212, user interface 1214, communication interface 1216, secure storage module 1218, and cryptographic logic module 1220. Host 1200 can also include other components (not explicitly shown) such as a battery, power controllers, and other components operable to provide various enhanced capabilities. In various embodiments, host 1200 can be implemented in a desktop computer, laptop computer, tablet computer, smart phone, other mobile phone, wearable computing device, or other systems having any desired form factor. Further, as noted above, host 1200 can be implemented partly in a base station and partly in a mobile unit that communicates with the base station and provides a user interface.

Storage device 1212 can be implemented, e.g., using disk, flash memory, or any other non-transitory storage medium, or a combination of media, and can include volatile and/or non-volatile media. In some embodiments, storage device 1212 can store one or more application and/or operating system programs to be executed by processing subsystem 1210, including programs to implement various operations described above as being performed by a host. For example, storage device 1012 can store a uniform host application that can read a peripheral device description record and generate a graphical user interface for controlling the peripheral device based on information therein. Storage device 1212 can also store program code executable to communicate with a transceiver 1205, as shown in FIG. 1, e.g., as described above. Although FIG. 9 illustrates transceiver 1205 as a subsystem of host 1200 it is understood that transceiver 1205 may be a dongle that is plugged into and electrically coupled with host 1200. In some embodiments, portions (or all) of the host functionality described herein can be implemented in operating system programs rather than applications. In some embodiments, storage device 1212 can also store apps designed for specific accessories or specific categories of accessories (e.g., an IP camera app to manage an IP camera peripheral device or a security app to interact with door lock accessories).

User interface 1214 can include input devices such as a touch pad, touch screen, scroll wheel, click wheel, dial, button, switch, keypad, microphone 1219, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1214 to invoke the functionality of host 1200 and can view and/or hear output from host 1200 via output devices of user interface 1214.

Processing subsystem 1210 can be implemented as one or more integrated circuits, e.g., one or more single-core or multi-core microprocessors or microcontrollers, examples of which are known in the art. In operation, processing system 1210 can control the operation of host 1200. In various embodiments, processing subsystem 1210 can execute a variety of programs in response to program code and can maintain multiple concurrently executing programs or processes. At any given time, some or all of the program code to be executed can be resident in processing subsystem 1210 and/or in storage media such as storage device 1212.

Through suitable programming, processing subsystem 1210 can provide various functionality for host 1200. For example, in some embodiments, processing subsystem 1210 can implement various processes (or portions thereof) described above as being implemented by a host. Processing subsystem 1210 can also execute other programs to control other functions of host 1200, including application programs that may be stored in storage device 1212. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 1205, as shown in FIG. 1, and as described above.

Communication interface 1216 can provide voice and/or data communication capability for host 1200. In some embodiments communication interface 1216 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1216 can provide wired network connectivity (e.g., Ethernet) in addition to or instead of a wireless interface. Communication interface 1216 can be implemented using a combination of hardware (e.g., driver circuits, antennas, modulators/demodulators, encoders/decoders, and other analog and/or digital signal processing circuits) and software components. In some embodiments, communication interface 1216 can support multiple communication channels concurrently or at different times, using the same transport or different transports. Thus, for example, host 1200 can communicate with accessories via a local channel at some times and via a relay service at other times.

Secure storage module 1218 can be an integrated circuit or the like that can securely store cryptographic information for host 1200. Examples of information that can be stored within secure storage module 1218 include the host's long-term public and secret keys 1222 (LTPKC, LTSKC), a list of local pairings 1224 (e.g., a lookup table that maps a local peripheral device identifier to a peripheral device long-term public key (LTPKA) for accessories that have completed a local pair setup or pair add process, e.g., as described above, with host 1200), and a list of relay pairings 1226 (e.g., peripheral device RAs and associated access tokens for accessories that have established a relay pairing, e.g., as described above, with host 1200). In some embodiments, pairing information can be stored such that a local pairing 1224 is mapped to the corresponding relay pairing 1226 in instances where both a local pairing and a relay pairing with the peripheral device have been established.

In some embodiments, cryptographic operations can be implemented in a cryptographic logic module 1220 that communicates with secure storage module 1218. Physically, cryptographic logic module 1220 can be implemented in the same integrated circuit with secure storage module 1218 or a different integrated circuit (e.g., a processor in processing subsystem 1210) as desired. Cryptographic logic module 1220 can include various logic circuits (fixed or programmable as desired) that implement or support cryptographic operations of host 1200, including any or all cryptographic operations described above. Secure storage module 1218 and/or cryptographic logic module 1220 can appear as a "black box" to the rest of host 1200. Thus, for instance, communication interface 1216 can receive a message in encrypted form that it cannot decrypt and can simply deliver the message to processing subsystem 1210. Processing subsystem 1210 may also be unable to decrypt the message, but it can recognize the message as encrypted and deliver it to cryptographic logic module 1220. Cryptographic logic module 1220 can decrypt the message (e.g., using information extracted from secure storage module 1218) and determine what information to return to processing subsystem 1210. As a result, certain information can be available only within secure storage module 1218 and cryptographic logic module 1220. If secure storage module 1218 and cryptographic logic module 1220 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1200 can perform all operations described above as being performed by a media access device and that an implementation of peripheral device 1100 can perform any or all operations described above as being performed by a peripheral device. A proxy, bridge, tunnel, or coordinator can combine components of host 1200 and peripheral device 1100, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for synchronizing a change in operating modes among a plurality of peripheral devices that are coupled to a host computing device, wherein each of the plurality of peripheral devices are configured to operate in one of a plurality of power modes at a given time and wherein each of the plurality of power modes corresponds to a respective rate of power consumption of the respective one of the plurality of peripheral devices, the method comprising:

receiving, by the host computing device, a signal from a first peripheral device of the plurality of peripheral devices indicating a request for an intended change in a power mode of the first peripheral device by circuitry of the first peripheral device configured to determine, according to a first set of criteria, which power mode the first peripheral device operates within;

determining, by the host computing device, a power mode that a second peripheral device of the plurality of peripheral devices is operating within, wherein the second peripheral device includes circuitry configured to determine, according to a second set of criteria, which power mode the second peripheral device operates within;

in response to receiving the signal and based on the power mode that the second peripheral device is operating within, transmitting, by the host computing device, a command to either the first or the second peripheral device to select, regardless of the determination of the circuitry of the respective first or second peripheral device, which power mode that the first or second peripheral device operates within, wherein the selected power mode and the power mode that the second peripheral device is operating within constitute an operating mode having an operating feature of the first and second peripheral devices.

2. The method of claim 1, wherein:
the intended change in the power mode of the first peripheral device is an intended change to a higher power consumption mode; and
the command to select the power mode is transmitted to the second peripheral device to enter a higher power consumption mode.

3. The method of claim 1, wherein:
the intended change in the power mode of the first peripheral device is an intended change to a lower power consumption mode; and
the command to select the power mode is transmitted to the first peripheral device to maintain a higher power consumption mode.

4. The method of claim 1, wherein the operating feature comprises enabling or disabling an exterior lighting scheme and wherein the command to the first or the second peripheral device synchronizes the enabling or disabling of exterior lights across the first and the second peripheral devices.

5. The method of claim 1, wherein the operating feature comprises enabling or disabling features of at least one of the first and the second peripheral devices.

6. The method of claim 1, wherein the operating feature comprises an amount of time from when a user provides input to the first peripheral device to when the host receives data associated with the input.

7. The method of claim 1, wherein the first set of criteria includes an idle time of the device.

8. The method of claim 1, wherein the first set of criteria includes detection of a user input to the first peripheral device.

9. A system comprising:
one or more processors; and
one or more non-transitory computer-readable storage mediums containing instructions configured to cause the one or more processors to perform operations including:
receiving, a signal from a first peripheral device of a plurality of peripheral devices indicating a request for an intended change in a power mode of the first peripheral device by circuitry of the first peripheral device configured to determine, according to a first set of criteria, which power mode the first peripheral device operates within;
determining a power mode that a second peripheral device of the plurality of peripheral devices is operating within, wherein the second peripheral device includes circuitry configured to determine, according to a second set of criteria, which power mode the second peripheral device operates within; and
in response to receiving the signal and based on the power mode that the second peripheral device is operating within, transmitting a command to either the first or the second peripheral device to select, regardless of the determination of the circuitry of the respective first or second peripheral device, which power mode that the first or second peripheral device operates within, wherein the selected power mode and the power mode that the second peripheral device is operating within constitute an operating mode having an operating feature of the first and second peripheral devices.

10. The system of claim 9, wherein:
the intended change in the power mode of the first peripheral device is an intended change to a higher power consumption mode; and
the command to select the power mode is transmitted to the second peripheral device to enter a higher power consumption mode.

11. The system of claim 9, wherein:
the intended change in the power mode of the first peripheral device is an intended change to a lower power consumption mode; and
the command to select the power mode is transmitted to the first peripheral device to maintain a higher power consumption mode.

12. The system of claim 9, wherein the operating feature comprises enabling or disabling an exterior lighting scheme and wherein the command to the first or the second peripheral device synchronizes the enabling or disabling of exterior lights across the first and the second peripheral devices.

13. The system of claim 9, wherein the operating feature comprises enabling or disabling features of at least one of the first and the second peripheral devices.

14. The system of claim 9, wherein the operating feature comprises an amount of time from when a user provides input to the first peripheral device to when the system receives data associated with the input.

15. The system of claim 9, wherein the first set of criteria includes an idle time of the device.

16. The system of claim 9, wherein the first set of criteria includes detection of a user input to the first peripheral device.

17. A non-transitory computer-program product tangibly embodied in a machine-readable non-transitory storage medium that includes instructions configured to cause one or more processors to perform operations including:
receiving, a signal from a first peripheral device of a plurality of peripheral devices indicating a request for an intended change in a power mode of the first peripheral device by circuitry of the first peripheral device configured to determine, according to a first set of criteria, which power mode the first peripheral device operates within;
determining a power mode that a second peripheral device of the plurality of peripheral devices is operating within, wherein the second peripheral device includes circuitry configured to determine, according to a second set of criteria, which power mode the second peripheral device operates within; and
in response to receiving the signal and based on the power mode that the second peripheral device is operating within, transmitting a command to either the first or the second peripheral device to select, regardless of the determination of the circuitry of the respective first or second peripheral device, which power mode that the first or second peripheral device operates within, wherein the selected power mode and the power mode that the second peripheral device is operating within constitute an operating mode having an operating feature of the first and second peripheral devices.

18. The non-transitory computer-program product of claim 17, wherein:
the intended change in the power mode of the first peripheral device is an intended change to a higher power consumption mode; and
the command to select the power mode is transmitted to the second peripheral device to enter a higher power consumption mode.

19. The non-transitory computer-program product of claim 17, wherein:
  the intended change in the power mode of the first peripheral device is an intended change to a lower power consumption mode; and
  the command to select the power mode is transmitted to the first peripheral device to maintain a higher power consumption mode.

20. The non-transitory computer-program product of claim 17, wherein the operating feature comprises enabling or disabling an exterior lighting scheme and wherein the command to the first or the second peripheral device synchronizes the enabling or disabling of exterior lights across the first and the second peripheral devices.

* * * * *